United States Patent [19]

Eaton et al.

[11] Patent Number: 4,656,971
[45] Date of Patent: Apr. 14, 1987

[54] NON-PLUGGING AIR DISTRIBUTION SYSTEM FOR SPENT BED COOLER

[75] Inventors: Robert L. Eaton, Ashland, Ky.; Edward V. Creamer, Huntington, W. Va.

[73] Assignee: Ashland Oil, Inc., Ashland, Ky.

[21] Appl. No.: 862,874

[22] Filed: May 13, 1986

Related U.S. Application Data

[63] Continuation-in-part of Ser. No. 699,716, Feb. 8, 1985.

[51] Int. Cl.⁴ .............................................. F22B 1/00
[52] U.S. Cl. .................................. 122/4 D; 34/57 A; 110/245; 165/104.16; 431/7; 431/170
[58] Field of Search .................. 431/7, 170; 122/4 D; 165/104.16; 110/245; 34/57 A

[56] References Cited

U.S. PATENT DOCUMENTS

| 3,633,887 | 1/1972 | Bechthold et al. | 431/170 X |
| 4,148,437 | 4/1979 | Barker et al. | 431/170 X |
| 4,387,667 | 6/1983 | Goodstine et al. | 122/4 D |

Primary Examiner—Edward G. Favors
Attorney, Agent, or Firm—Richard C. Willson, Jr.; C. William Crady; Stanley M. Welsh

[57] ABSTRACT

Apparatus is described for a non-plugging gas distribution system supplying fluidizing gas to a fluid bed undergoing cooling.

12 Claims, 8 Drawing Figures

NON-PLUGGING AIR DISTRIBUTION SYSTEM FOR SPENT BED COOLER

This application is a continuation-in-part of U.S. Ser. No. 699,716, filed Feb. 8, 1985.

BACKGROUND OF THE INVENTION (I) Field of the Invention

This invention relates to a gas distribution system which employs either header boxes or manifold systems having holes.

(II) Prior Art

In CO boilers (carbon monixide boilers) employing fluidized limestone to capture sulfur oxides, there is a need to remove spent limestone which has become sulfated. Since the sulfated limestone, when it leaves a CO boiler, often reaches temperatures as high as 1500° F., it is necessary to cool such fluidized limestone to temperatures on the order of 350° F. so that the cooled solids may be transported and handled by conventional conveyor systems, such as sold by Dynamic Air, St. Paul, Minn. An example of a limestone fluid bed boiler known in the art would be one sold by Foster-Wheeler Corporation, Livingston, N.J. An example of a waste bed cooler to reduce the temperature of spent limestone (calcium oxide, managenese oxide, and other materials that are employed in such CO boilers) is one sold by Procedyne Corp., Box 1286, New Brunswick, N.J. The CO boiler, the conveyor and the waste bed cooler per se are not a part of this invention.

One problem of commercially available waste bed coolers for solids is that the air distribution system employed to maintain a fluidized bed of solid particles therein over a period of time tends to become plugged. Efforts to lessen or avoid such plugging, which were tried unsuccessfully, included: filtering the air used in the distribution system; shaving one or more portions of bolts that are inserted through air distribution holes and varying the air distribution rate to different sections of the fluidized bed; and supplementing the fluidizing medium through distribution pipes so as to permit a lessening of the overall flow rate through the distribution plate holes. While all of these methods to some degree lessened the frequency of plugging, they failed to eliminate it for more than about three months at a time.

The spent limestone particles to be cooled have an average overall particle diameter in equivalent spherical dimensions in the range of about 500 to about 1,500 microns. The specific gravity of the particles is in the range of about 2 to about 4, and preferably in the range of about 2 to about 3. The pressure drop across the fluidized bed is in the range of about 30 to about 60 inches of a water column. The air grid pressure drop is in the range of from about 12 to about 40 inches of a column of water. (The maximum differential pressure for the system across the air distribution system from within the distribution boxes to the fluidized bed is about 40 inches of a column of water and the minimum is about 12 inches of a column of water.) The maximum pressure differential of 40 inches is determined by commercial blowers or systems for pressuring vapors that are commonly used in a petroleum refinery. However, larger pressure differentials can be used but do not lead to any significant improvement in performance and might even be deleterious if the pressure drop leads to channeling or loss of fluidized bed material through the air removal system. The minimum differential pressure of about 12 inches is determined by the minimum amount of pressure necessary to maintain equal distribution of the cooling air. The pressure drop across the bed about 30 to 40 inches, is the minimum to maintain a fluidized bed.

BRIEF DESCRIPTION OF THE INVENTION

In view of the plugging difficulty associated with gas manifolds employing holes through plates, it is an object of this invention to substantially lessen and avoid such plugging problems and consequent excessive pressure drop. The distribution system of this invention comprises an assembly of hardware elements which coact to provide a uniform flow of gas to and through a fluidized bed of solids.

One solution to plugging problems is disclosed in U.S. Ser. No. 699,716 filed Feb. 8, 1986. This patent application relates to situations in which the top plate of the gas distribution or supply box (see FIG. III) is threaded. A combination of apparatus elements including a threaded bolt and a castlenut coact with the threaded holes in the top of the box to provide a non-plugging distribution system.

Because it is not practical for the top of the gas supply box to be more than about 0.250 inches thick, there is a tendency for workmen to damage and/or to completely strip the threads surrounding the holes in the plate comprising the box top. Repair can be accomplished only by tapping new threads or permanently plugging the hole.

This invention provides a fluidizing gas distribution system and apparatus featuring unthreaded holes in the top of the gas supply box. In one embodiment, the fastener is a threaded bolt which combines with hex slotted nuts or castlenuts to impose a horizontal flow path as the fluidizing gas exits through the unthreaded holes. In another embodiment, the fastener is a pin grip blind rivet which combines with a hex slotted nut or castlenut located on the top of the box acting to impose the desired horizontal flow path on the exiting fluidizing gas.

BRIEF DESCRIPTION OF THE DRAWINGS

FIG. I is a perspective view of a spent bed cooler.

FIG. II is a side elevation schematic view of FIG. I in cross-section.

FIG. III is a top planar view looking down on the air distribution system of FIG. II along line 3—3.

FIG. IV is a perspective view of a single gas distribution box with the top plate raised above the edges of the box.

FIG. V is a side elevation of a two castlenut and threaded bolt combination.

FIG. VI is a perspective view of FIG. V showing the path of gas flow through a hole drilled in the plate.

FIG. VII is a side elevation of a pin grip blind rivet and castlenut combination with the shank portions engaged with the bottom of the distribution plate.

FIG. VIII is a perspective view of FIG. VII showing the path of gas flow through the hole in the plate and the openings in the fillet of the castlenut.

DETAILED DESCRIPTION OF THE INVENTION

Figure 1:
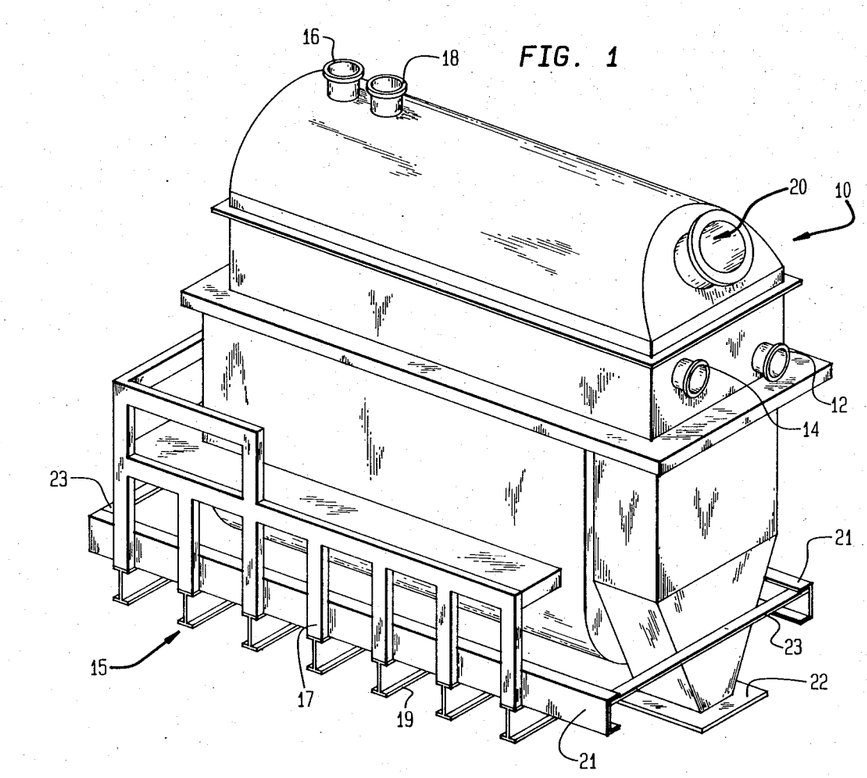
Figure 2:
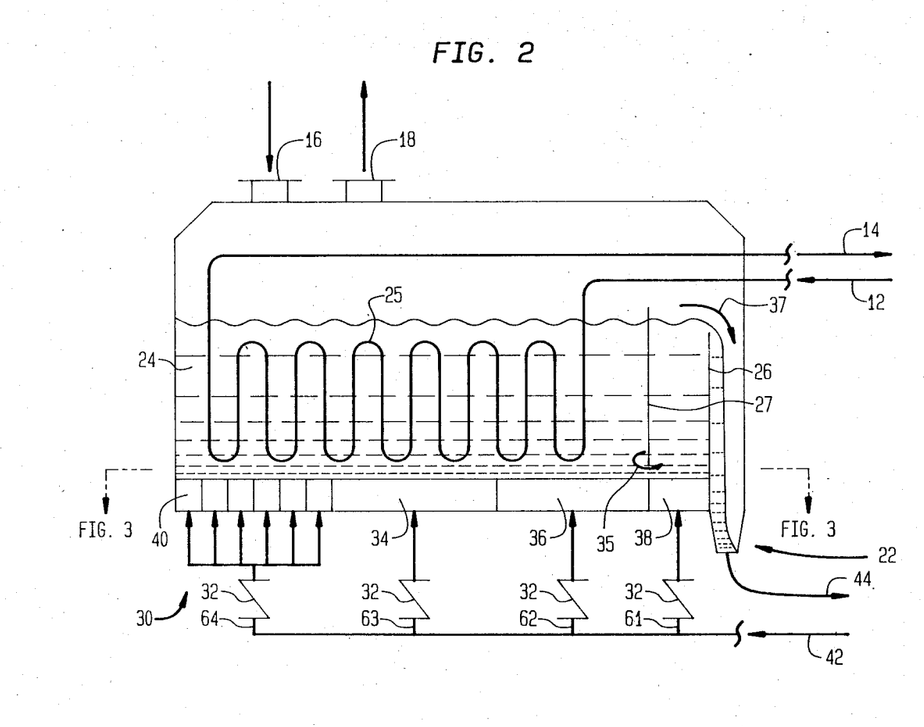
Figure 3:
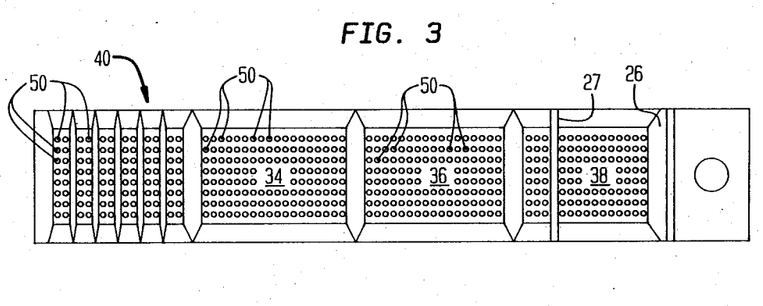
Figure 4:
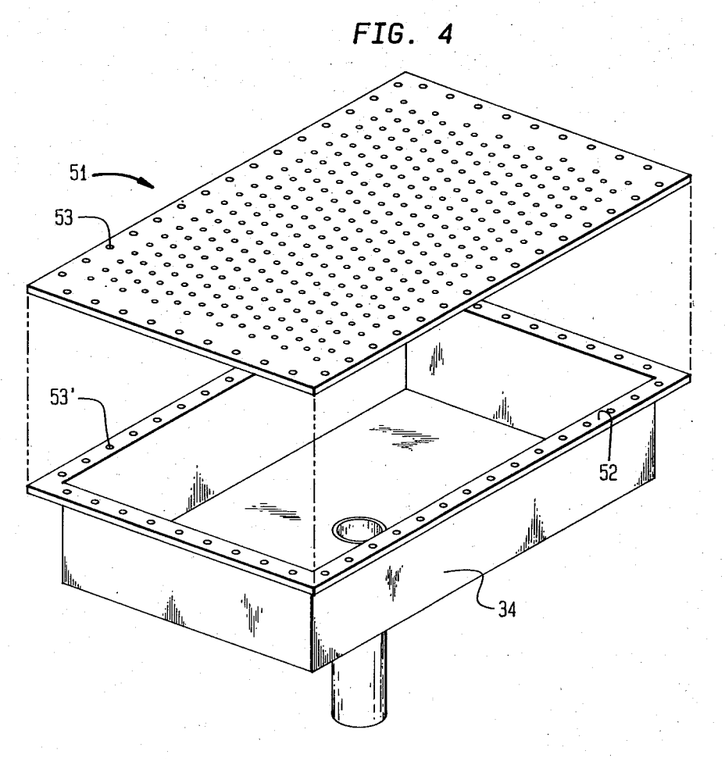
Figure 5:
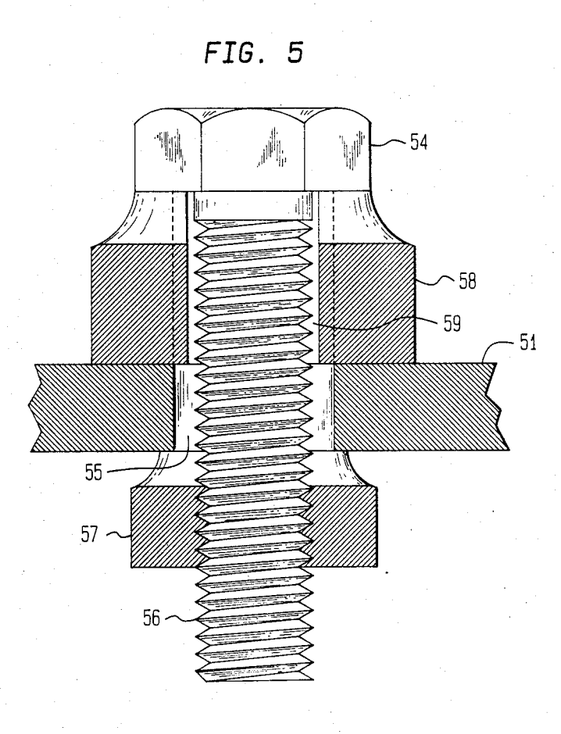
Figure 6:
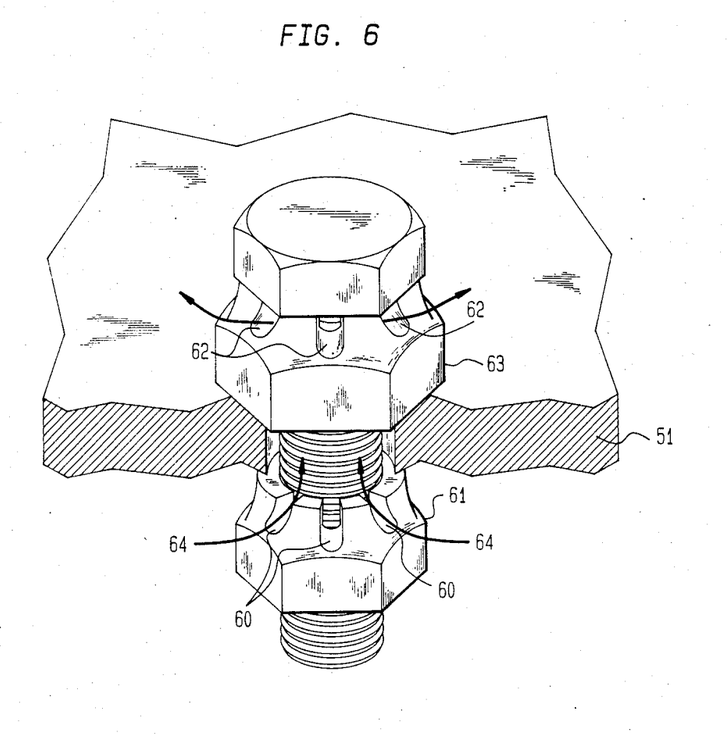
Figure 7:
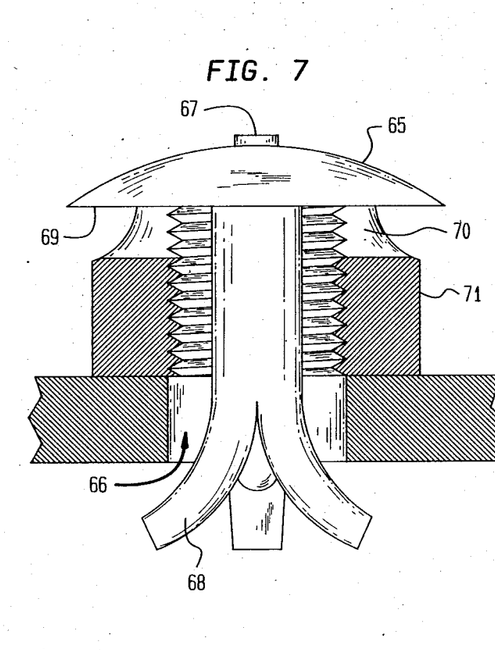
Figure 8:
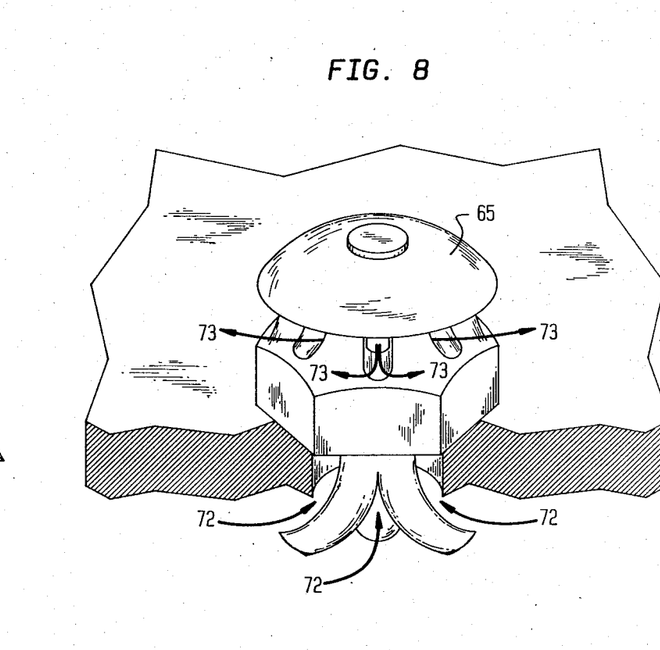

Referring to FIG. I, there is disclosed a perspective view of a spent bed cooler. As it is used in this specification the term spent bed cooler means a device for cooling spent solids from their reaction temperature to a temperature suitable for handling, transportation and disposal. In spent bed cooler 10, there is a cooling water inlet 12, a cooling water outlet 14, a hot solids inlet 16, a cooled solids outlet 22, an exhaust gas (e.g. air) outlet 18, a man-way entrance 20, and a support frame 15, consisting of beams 17 and "I" beams 19. "U" shaped beams 21 along each side with tying beams 23 front and back. Support frame 15 provides support to the walls of cooler 10, which walls under the load and pressure of fluidized bed 24 (shown in FIG. II), tends to bulge outward.

FIG. II discloses a side elevation schematic view of FIG. I. Arrows indicate the direction of material flow. Disclosed in FIG. II is heat exchange coil 25, an air distribution system 30, comprising gas distribution boxes 34, 36, 38 and 40. In this embodiment box 40 is divided into six box units each with its own air supply. This arrangement allows for thermal expansion.

Briefly, the operation of a spent bed cooler 10 is given hereinafter. Spent hot solids from a fluidized boiler are introduced through inlet 16 and dropped into fluidized bed 24. Fluidized bed 24 contacts heat exchanger 25 and spent solids are thereby cooled as they move through cooler 10 in the direction of arrows 35 and 37. Flow weir 26 determines the overall height of fluidized bed 24, and flow weir 27 promotes mixing of the material before exiting the cooler. Solid particulates are removed through outlet 22 into conduit 44 from cooler 10. Water is introduced into inlet 12 and removed through outlet 14. Exhaust air is removed through outlet 18. Man way 20 permits the possibility for a person to enter the interior of cooler 10 for maintenance and inspection.

Referring to FIG. III, the air distribution system is shown in a top plan view. Air distribution subsystem 40 comprises six small air supply boxes 6 inches wide and about 26½ inches long. The unthreaded gas distribution holes through the small boxes are such that there are 35 holes per row and nine rows per each box. Air distribution box 34 is 44⅝ inches wide and 26½ inches long having 71 rows of unthreaded holes wherein there are 40 holes per row (a total of 3,160 holes). Distribution box 36 is 41¼ inches wide and 26¼ inches long, and has 2,800 holes in 64 rows of 40 holes per row. Distribution box 38 has 2,273 holes in 54 rows of 40 holes per row and is 33 inches wide and 26¼ inches long.

Referring again to FIG. II, into each air distribution box are a set of supply pipes which are fed from conduit 42. These pipes each have independently controllable valves 32 which control the flow rate of air into each air distribution box of the system. Preferably, through conduit 42, fludizing air at a rate of about 20,000 to 25,000 lbs/hour of air or 4,400 to 5,500 scfm (standard cubic feet per minute) at about 120° F. enters into the various distribution box supply conduits 61, 62, 63 and 64. The rate of flow through conduits 61, 62, 63 and 64, respectively are: about 1,000 scfm; about 1,500 scfm, about 1,200 scfm, and finally, about 770 scfm. The temperature of the exhaust air through outlet 18 is roughly 658° F. and air exits at a rate of 4,500 scfm or about 20,250 lbs/hours. Sulfated limestone is introduced into inlet 16 at a rate of 10,000 to 23,000 pounds per hour at a temperture in the range of 1200° to 1800° F. but not in excess of 1,700° F. The temperature profile of the bed decreases toward outlet 22 where cooled solids are recovered at a temperature in the range of 200°–400° F. Water at 366° F. at 220 pound per square inch gauge ("psig") maximum enters heat exchange coil 25 and leaves at a temperature of 387° F. and 200 psig maximum. The rate of cooling water flow is in the vicinity of 200,000 pounds per hour.

Referring to FIG. IV, an embodiment is shown in which the top plate 51 is detached and raised above the lip 52 of box 34. Holes 53 have been drilled in the plate which mate with holes 53 in the lip of the box. Similar holes which mate with one another are spaced around the periphery of the plate and the lip of the box enabling the plate 51 to be bolted (bolts and nuts not shown) to the top 52 of the box. This represents a departure from the prior art air boxes which relied on welding to fix the top plate to the box. The removable top plates can be removed from the cooler for servicing.

FIGS. V and VI disclose a preferred embodiment of the invention comprising a gas distribution assembly in which a threaded bolt 54 traverses the drilled unthreaded hole 55. The shaft 56 of the bolt has a diameter smaller than the diameter of hole 55. FIG. V shows one set of preferred size relationships, e.g. a ¼"×20 UNC bolt 54; a 3/16" plate 51 with a 5/16" unthreaded hole 55; a ¼" hex castlenut 57 run up against the bottom of the plate and a 5/16" hex castlenut 58 engaging the top of the plate and the bottom of the head of bolt 54. The 5/16" castlenut provides a space 59 for fluidizing air passage. FIG. VI shows the flow path of air from below plate 51 via the spaces 60 in the filleted part 61 of the castlenut and the exit of the air in a horizontal vector from the spaces 62 in the filleted part 63 of the castlenut 58. To maintain the desired flow path it is necessary the fillet end of castlenut 57 face up and proximate the bottom of hole 55. While the fillet end of castlenut 58 may face down, it is preferred that the nut be mounted as shown in FIGS. V and VI.

The conventional castlenut has six arch shape openings which can be squared or rounded at the top of the arch. This arrangement can provide for as many as six radial streams of gas emanating from the top of the nut. The castlenuts in cooperation with the other elements of the invention reduce plugging of the air distribution system. While castlenuts are preferred, hex slotted nuts may also be employed.

In FIG. VI, arrows 64 show the flow of fluidizing gas from the gas box through the castlenut and the hole while arrows 65 show the gas flow radially from the spaces in the castlenut.

FIGS. VII and VIII disclose a unique embodiment of the invention comprising a gas distribution assembly in which a pin grip blind rivet 65 traverses the drilled unthreaded hole 66. When the pin 67 is driven flush with the head, the slotted shank 68 expands and grips firmly. The bottom 69 of the rivet head 68 is flush with the top of the fillet portion 70 of castlenut 71. The inside diameter of the castlenut is one size larger than the diameter of the rivet. FIG. VIII shows the flow of fluidizing gas through the gas distribution assembly. Fluidizing gas passes from the gas box via the spaces 72 formed by expansion of the rivet (see arrows), following traverse of the unthreaded hole and castlenut, the gas flows radially in a horizontal vector via the spaces in the fillet portion of the castlenut—see arrows 73. Other nuts, sleeves on hollow spacers can be formed, machined or modified to provide radial openings preferable arch shaped, slotted or sawtooth to provide 40 to 60 volume percent open space where the gas passes through.

The air flow path resulting from the apparatus combinations disclosed herein reduces plugging because the solids are pushed radially and horizontally away from the holes and channeling of gas in the fluid bed is reduced.

The bolt and castlenut combinations and the rivets employed in this invention can be selected by one skilled in the art employing standard sizes disclosed by technical publications such as Machinery's Handbook, 21$^{st}$ Edition, Industrial Press Inc.; Standard Handbook of Fastening and Joining, McGraw-Hill, 1977, fastener standards compiled by Industrial Fasteners Institute, 1505 East Ohio Building, Cleveland, Ohio 44114, and Product Brochure 1978, Star Expansion Industries, Mountainville, N.Y. 10953.

The nuts, bolts and rivets may be carbon steel, stainless steel, aluminum or other suitable material. The top plates of the air boxes may be from about 10 gauge to one quarter inch inch thick steel. The bolts may be from about one half to about one and one half inch in length depending on the thickness of the air box top, the height of the sides of the castlenut and from about one quarter to one half inch in diameter with about 13–20 threads to the inch. Bolt heads may be square, hexagonal, or screw head type such as phillips head.

Suitable rivets are preferably hammer driven blind type with a river body of aluminum alloy and a stainless steel drive pin. Rivets with the proper dimensions of head diameter, shank diameter and length can be selected depending on the size of the holes drilled in the air box covers and the thickness of the covers.

Specific compositions, methods, devices, equipment or embodiments discussed herein are intended to be only illustrations of the invention disclosed by this specification. Variation on these compositions, methods, devices, equipment or embodiments will be readily apparent to a person of skill in the art based upon the teachings of this specification and are therefore intended to be included as part of the inventions disclosed herein.

We claim:

1. In a distribution system for fluidizing gas comprising holes through plates wherein there is a pressure drop through at least a portion of such holes of at least 12 inches of a column of water, the improvement which comprises: restricting gas passage through unthreaded holes by means of a fastener comprising a threaded bolt or a rivet wherein in cooperation with said fastener there is a means for imposing a horizontal flow path as said fluidizing gas exits upwardly through said unthreaded holes said means comprising nuts or unthreaded spacers having openings in the top circumference comprising 10–80 vol. % of said means whereby a non-plugging distribution system for gas to a fluidized bed is achieved.

2. The improved distribution system for fluidizing gas of claim 1, wherein the means for imposing a horizontal flow over the top of said plate consists of a castle nut in cooperation with said fastener, the openings in said castlenut being proximate the bottom of the head of said fastener.

3. The distribution system of claim 1 in which said gas is air.

4. The distribution system of claim 1 in which the pressure drop is in the range of 12–40 inches of water.

5. Apparatus according to claim 1 in which the solid particulates are spent limestone having a particle size in the range of 500–2500 microns.

6. Apparatus according to claim 1 in which the solid particulates are cooled from a temperature in the range of 1200° F. to 1800° F. to a temperature in the range of 200°–400° F.

7. Apparatus for passing a fluidizing gas upwardly through a fluid bed of solid particulates comprising, in combination:
   A. at least one gas supply box directly beneath said bed, the top plate of said box containing a multiplicity of drilled holes uniformly spaced over said surface;
   B. a gas distribution assembly comprising a threaded bolt traversing each hole, a first filleted castlenut mounted on said bolt below the hole wherein the openings in the fillet of the castlenut are adjacent the bottom of the hole, and a second filleted castlenut mounted on said bolt above the hole wherein the bottom surface of the second castlenut contacts the upper surface of said plate and the upper surface of the second castlenut contacts the head of the bolt.

8. Apparatus according to claim 7 in which the openings in said second filleted castlenut are proximate the bottom of the head of said bolt.

9. Apparatus according to claim 8 in which said openings comprise 40–60 volume percent of the filleted area of said castlenut.

10. Apparatus for passing a fluidizing gas upwardly through a fluid bed of solid particulates comprising, in combination:
    A. at least one gas supply box directly beneath said bed, the top plate of said box containing a multiplicity of drilled holes uniformly spaced over said surface; and
    B. a gas distribution assembly comprising a pin grip blind rivet traversing each hole, the slotted shank of each rivet being expanded to grip the bottom surface of the plate, and means for imposing a horizontal flow path as said fluidizing gas exits said drilled holes said means comprising slotted nuts, castlenuts or unthreaded spacers having openings adjacent the bottom of the head of said rivet.

11. Apparatus according to claim 10 in which said means is a filleted castlenut.

12. Apparatus according to claim 10 in which said means is an unthreaded spacer having openings comprising 40–60 volume percent of the upper end of the spacer.

* * * * *